United States Patent
Liu et al.

(10) Patent No.: US 10,663,393 B2
(45) Date of Patent: May 26, 2020

(54) SPECTRUM INSPECTING APPARATUS

(71) Applicant: Nuctech Company Limited, Beijing (CN)

(72) Inventors: Haihui Liu, Beijing (CN); Hongqiu Wang, Beijing (CN); Yumin Yi, Beijing (CN); Jianhong Zhang, Beijing (CN); Ankai Wang, Beijing (CN)

(73) Assignee: Nuctech Company Limited, Beijing (CN)

( * ) Notice: Subject to any disclaimer, the term of this patent is extended or adjusted under 35 U.S.C. 154(b) by 81 days.

(21) Appl. No.: 15/858,274

(22) Filed: Dec. 29, 2017

(65) Prior Publication Data
US 2018/0188158 A1 Jul. 5, 2018

(30) Foreign Application Priority Data

Dec. 29, 2016 (CN) .......................... 2016 1 1247477

(51) Int. Cl.
*G01N 21/25* (2006.01)
*G01N 21/39* (2006.01)
(Continued)

(52) U.S. Cl.
CPC .......... *G01N 21/255* (2013.01); *G01N 21/39* (2013.01); *G01N 21/4795* (2013.01);
(Continued)

(58) Field of Classification Search
CPC .. G01N 21/255; G01N 21/39; G01N 21/4795; G01N 21/65; G01N 2021/3129;
(Continued)

(56) References Cited

U.S. PATENT DOCUMENTS

2005/0043597 A1    2/2005  Xie
2018/0067053 A1*   3/2018  Aizawa ................. G01N 21/65

FOREIGN PATENT DOCUMENTS

CN      1729389 A     2/2006
CN    201212925 Y     3/2009
(Continued)

OTHER PUBLICATIONS

"European Application Serial No. 17210847.4, Extended European Search Report dated Dec. 15, 2017", (May 7, 2018), 11 pgs.
(Continued)

*Primary Examiner* — Jamil Ahmed
(74) *Attorney, Agent, or Firm* — Schwegman Lundberg & Woessner, P.A.

(57) ABSTRACT

An embodiment of the present disclosure provides a spectrum inspecting apparatus. The apparatus includes a laser source; a focusing cylindrical lens configured to converge a light beam onto a sample; a light beam collecting device configured to collect a light beam signal, which is excited by the light beam, from the sample, so as to form a strip-shaped light spot; a slit configured to receive the collected light beam and couple it to downstream of a light path; a collimating device; a dispersing device configured to disperse the collected light beam so as to form a plurality of sub-beams having different wavelengths; an imaging device configured to image the sub-beams on the photon detector array respectively, wherein the light beam emitted from the laser source has a rectangular cross-section, the strip-shaped light spot impinges on the slit and its length is smaller than a length of the slit.

19 Claims, 4 Drawing Sheets

(51) Int. Cl.
*G01N 21/65* (2006.01)
*G01N 21/47* (2006.01)
*G01N 21/31* (2006.01)

(52) U.S. Cl.
CPC ..... *G01N 21/65* (2013.01); *G01N 2021/3129* (2013.01); *G01N 2021/3137* (2013.01); *G01N 2021/393* (2013.01); *G01N 2021/399* (2013.01)

(58) Field of Classification Search
CPC ..... G01N 2021/3137; G01N 2021/393; G01N 2021/399
See application file for complete search history.

(56) References Cited

FOREIGN PATENT DOCUMENTS

| CN | 101504364 A | 8/2009 |
|---|---|---|
| CN | 102183304 A | 9/2011 |
| CN | 103245416 A | 8/2013 |
| CN | 104330161 A | 2/2015 |
| CN | 204165650 U | 2/2015 |
| CN | 204359434 U | 5/2015 |
| CN | 104949958 A | 9/2015 |
| CN | 206348071 U | 7/2017 |
| WO | WO-2016152823 A1 | 9/2016 |

OTHER PUBLICATIONS

Barbillat, J., et al., "Raman confocal microprobing, imaging and fibre-optic remote sensing: A further step in molecular analysis", Journal of Raman spectroscopy 25.1, (1994), 3-11.

"Chinese Application Serial No. 201611247477.5, Office Action dated Mar. 7, 2018", w/ English Translation, (Mar. 7, 2018), 8 pgs.

"Chinese Application Serial No. 201611247477.5, Office Action dated Nov. 10, 2017", w/ English Translation, (Nov. 10, 2017), 14 pgs.

"European Application Serial No. 17 210 847.4, Office Action dated Mar. 26, 2019", (Mar. 26, 2019), 8 pgs.

\* cited by examiner

SPECTRUM INSPECTING APPARATUS

CROSS-REFERENCE TO RELATED APPLICATION

This application claims priority of Chinese Patent Application No. 201611247477.5 filed on Dec. 29, 2016 in the State Intellectual Property Office of China, the disclosure of which is incorporated herein by reference.

BACKGROUND OF THE DISCLOSURE

Field of the Disclosure

The present disclosure relates to a technical field of spectrum inspection, and particularly to a spectrum inspecting apparatus.

Description of the Related Art

Spectrum inspection technology is widely used in recognition and analysis of substances. By collecting a light signal obtained from a sample being inspected, a spectrum inspecting apparatus can generate a spectrogram of the sample being inspected. For example, by comparing an actually obtained spectrogram with spectrograms of known substances in an existed spectrograms database, it can determine components of the sample being inspected. A spectrometer is a commonly-used spectrum inspecting apparatus. It can separate light signals with different wavelengths being mixed together be means of a dispersing element, arrange them onto a detector, and finally obtain spectral lines that indicate the signal intensity distribution at different wavelengths. Resolution of a spectrometer represents the spectrometer's resolution between two signals at adjacent wavelengths, and determines the precision of characteristic information carried by the resulted spectrogram. In spectrum inspection and analysis, resolution parameters of a spectrometer have important significance in accurately discriminating the substances and determining their chemical components and relative contents. In order to obtain a high resolution, it is usually desired to use a narrow slit. However, it may result in that the intensity of light is notably weakened by the slit, and thus influence an optical efficiency.

SUMMARY OF THE DISCLOSURE

An embodiment of the present application provides a spectrum inspecting apparatus including: a laser source configured to emit a light beam; a focusing lens configured to converge the light beam onto a sample being inspected; a light beam collecting device configured to collect a light beam signal, which is excited by said light beam, from the sample being inspected so as to form a collected light beam, and converge the collected light beam so as to form a strip-shaped light spot; a slit configured to receive the collected light beam that has been converged by the light beam collecting device, and couple the collected light beam to downstream of a light path; a collimating device configured to collimate the collected light beam from the slit; a dispersing device configured to disperse the collected light beam that has been collimated by the collimating device so as to form a plurality of sub-beams having different wavelengths; an imaging device and a photon detector array, the imaging device being configured to image the plurality of sub-beams on the photon detector array respectively, the photon detector array being used to convert the plurality of sub-beams imaged thereon into electrical signals for forming a spectrogram, wherein the light beam emitted from the laser source has a rectangular cross-section, the focusing lens is a cylindrical lens, the strip-shaped light spot impinges on the slit, and a length of the strip-shaped light spot is smaller than a length of the slit so that the strip-shaped light spot entirely falls into the slit in a lengthwise direction.

DETAILED DESCRIPTION OF THE EMBODIMENTS

Figure 1:
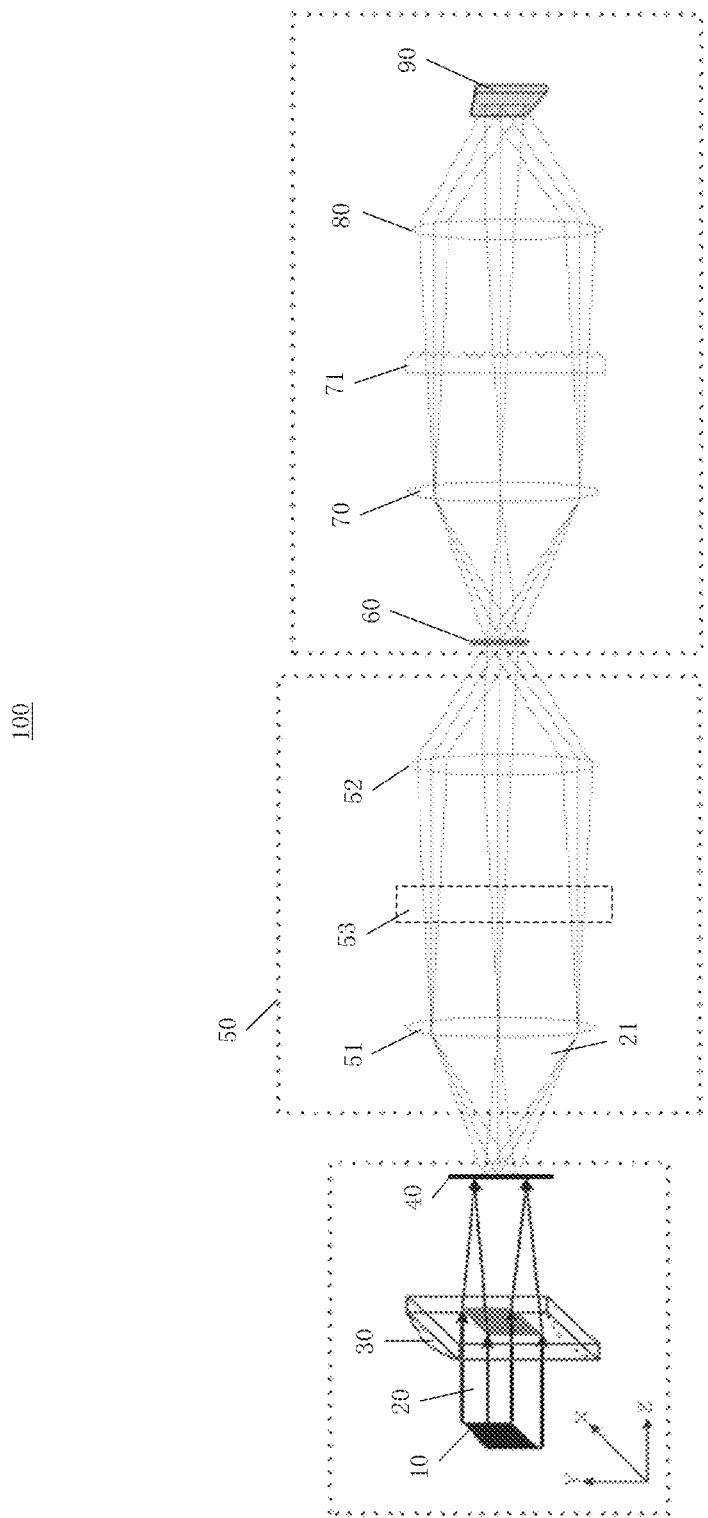
FIG. 1 schematically shows a spectrum inspecting apparatus according to an embodiment of the present disclosure.

Technical solutions of the present disclosure will be described hereinafter in more detail by the way of embodiments with reference to the attached drawings. The same or similar reference numerals refer to the same or similar elements throughout the description. The explanation to the embodiments of the present disclosure with reference to the attached drawings is intended to interpret the general concept of the present disclosure, rather than being construed as a limiting to the present disclosure.

According to the general concept of the present disclosure, it provides a spectrum inspecting apparatus including a laser source configured to emit a light beam; a focusing lens configured to converge the light beam onto a sample being inspected; a light beam collecting device configured to collect a light beam signal, which is excited by the light beam, from the sample being inspected so as to form a collected light beam, and converge the collected light beam so as to form a strip-shaped light spot; a slit configured to receive the collected light beam that has been converged by the light beam collecting device, and couple the collected light beam to downstream of a light path; a collimating device configured to collimate the collected light beam from the slit; a dispersing device configured to disperse the collected light beam that has been collimated by the collimating device so as to form a plurality of sub-beams having different wavelengths; an imaging device and a photon detector array, the imaging device being configured to image the plurality of sub-beams on the photon detector array respectively, the photon detector array being used to convert optical signals of the plurality of sub-beams imaged thereon into electrical signals for forming a spectrogram, wherein the light beam emitted from the laser source has a rectangular cross-section, the focusing lens is a cylindrical lens, the strip-shaped light spot impinges on the slit, and a length of the strip-shaped light spot is smaller than a length of the slit so that the strip-shaped light spot can entirely fall into the slit in a lengthwise direction.

Additionally, for the purpose of explanation, a lot of specific details are set forth in the following description to provide a comprehensive understanding of the disclosed embodiments. It is apparent that, however, one or more embodiments may also be implemented without these specific details.

FIG. 1 schematically shows a spectrum inspecting apparatus 100 according to an embodiment of the present disclosure. The spectrum inspecting apparatus 100 may include a laser source 10 configured to emit a light beam 20 having a rectangular cross-section; a focusing lens 30 configured to converge the light beam 20 onto a sample 40 being inspected; a light beam collecting device 50 configured to collect a light beam signal, which is excited by the light beam 20, from the sample 40 so as to form a collected light beam 21, and converge the collected light beam 21 so as to form a strip-shaped light spot 25; a slit 60 configured to receive the collected light beam 21 that has been converged by the light beam collecting device 50, and couple the collected light beam 21 to downstream of a light path (e.g., transmit the collected light beam 21 to a collimating device 70, a dispersing device 71 or the like at the downstream of the light path); a collimating device 70 configured to collimate the collected light beam 21 from the slit 60; a dispersing device 71 configured to disperse the collected light beam 21 that has been collimated by the collimating device 70 so as to form a plurality of sub-beams 81, 82 having different wavelengths; an imaging device 80 and a photon detector array 90, the imaging device 80 being configured to image the plurality of sub-beams 81, 82 on the photon detector array 90 respectively, the photon detector array 90 being used to convert optical signals of the plurality of sub-beams 81, 82 imaged thereon into electrical signals for forming a spectrogram, wherein the strip-shaped light spot 25 impinges (irradiates) on the slit 60, and a length of the strip-shaped light spot 25 is smaller than a length of the slit 60 so that the strip-shaped light spot 25 can entirely fall into the slit 60 in a lengthwise direction (y-direction shown in FIG. 2). The focusing lens 30 is a cylindrical lens. x, y and z shown in FIG. 1 indicate the axes in a Cartesian coordinate system, respectively.

Figure 2:
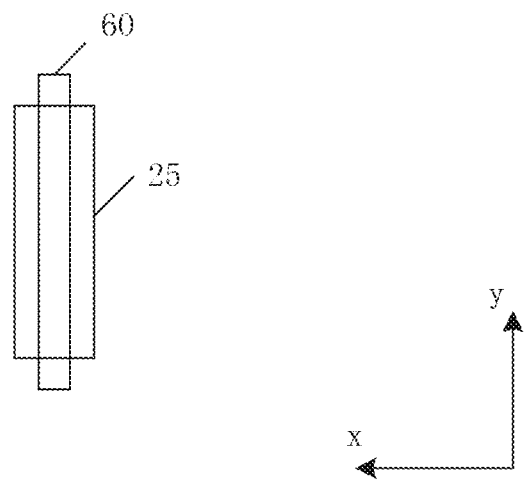
FIG. 2 schematically shows a slit of a spectrum inspecting apparatus according to an embodiment of the present disclosure, with a light spot irradiating on the slit.

FIG. 2 shows examples of a strip-shaped light spot 25 and a slit 60. The slit 60 is an important member that determines the resolution of a resulted spectrogram. The less the width of the slit 60 is, the higher the resolution of the resulted spectrogram will be. Therefore, the slit 60 may usually be provided in an elongate shape to obtain a smaller width. The amount of light passing through the slit 60 is also an important index. If the amount of light passing through the slit 60 is low, it may result in that the intensity of optical signal obtained on the photon detector array 90 is low, and thus the SNR is low, thereby degrading the detection accuracy. A matching degree between the shapes of the most commonly-used round light spot and the slit 60 is low, in which most of the light energy is usually lost because of being blocked by the slit 60, whereas the strip-shaped light spot 25 can match well with the elongate shape of the slit 60. A lengthwise direction of the strip-shaped light spot 25 can be set to be consistent with a lengthwise direction of the slit 60 (y-direction shown in FIG. 2). The length of the strip-shaped light spot 25 is smaller than the length of the slit 60 so that the slit 60 substantially will not block the strip-shaped light spot 25 in the lengthwise direction. It helps to increase the amount of light passing through the slit 60 so that more amount of light, which carries spectral information of the sample, can pass through the silt 60 to the photon detector array 90, thereby achieving the purpose of increasing the SNR.

In order to obtain said strip-shaped light spot 25, it is possible to choose a laser source capable of emitting a light beam with a rectangular cross-section, such as a semiconductor laser diode. The laser beam emitted from the semiconductor laser diode can be shaped to a parallel light beam having a rectangular cross-section. Such shaping can be realized by known technology for shaping light beam in the art. After being converged by the focusing lens 30 (a cylindrical lens), the light beam having a rectangular cross-section forms an elongate light spot (or be called 'linear light spot') on the sample 40. In a direction across a cylindrical surface of the focusing lens 30 (x-direction shown in FIG. 1), the size of the light spot formed on the sample 40 remarkably becomes narrower. Correspondingly, after passing through the light beam collecting device 50, the elongate light spot forms the strip-shaped light spot 25 on a plane in which the slit 60 is located.

As an example, the width of the strip-shaped light spot 25 is smaller than 5 times of the width of the slit 60, for example, smaller than 3 times of the width of the slit 60, or smaller than 2 times of the width of the slit 60, or even smaller. The less difference between the width of the strip-shaped light spot 25 and the width of the slit 60 is, the less the amount of light blocked by the slit 60 is, and the larger the proportion of light passing through the slit 60 is. In an example, the strip-shaped light spot 25 completely covers the slit 60 in a width direction. Namely, the width of the slit 60 is smaller than the width of the strip-shaped light sport 25, as shown in FIG. 2. Thus, it can achieve a resolution as high as possible with the light energy of the strip-shaped light sport 25.

Figure 3:
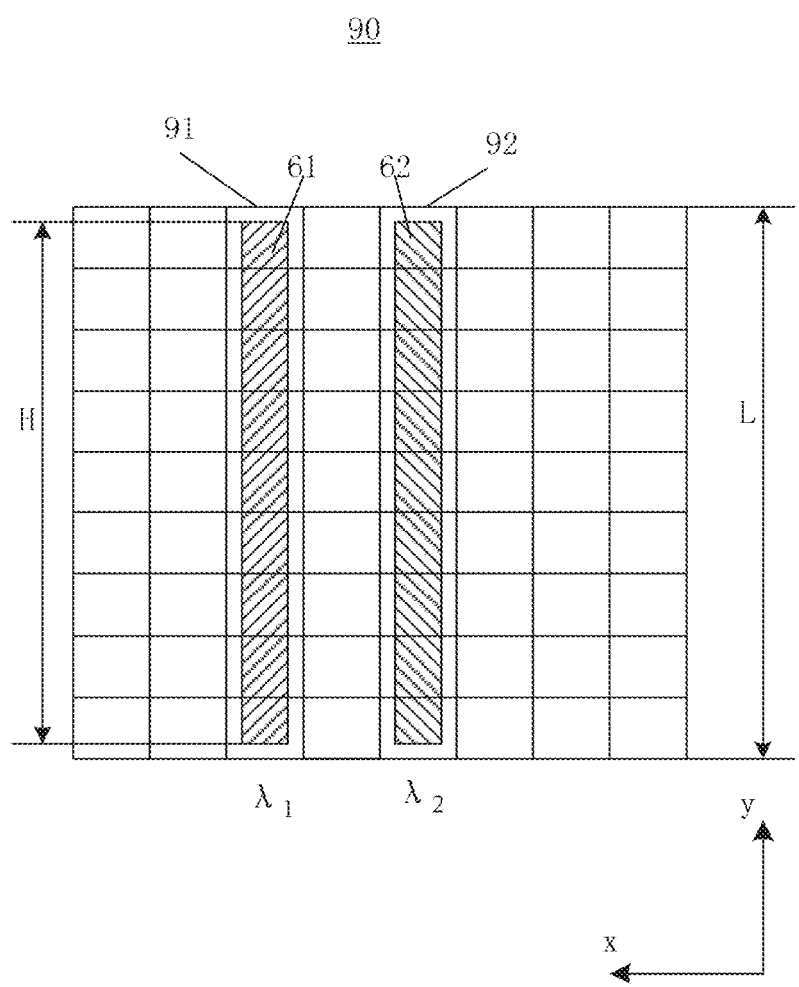
FIG. 3 schematically shows an example of pattern, which is imaged on the photon detector array through the dispersing device, of the light beam that has passed through the slit.

In an example, the dispersing device 71 (e.g., it may be a dispersing gating) can be configured to separate a plurality of sub-beams 81, 82 in a first direction (x-direction shown in FIG. 3). The photon detector array 90 has a plurality of rows of detecting unit 91, 92, wherein each row of detecting unit 91, 92 are arranged along a second direction (y-direction shown in FIG. 3) that is perpendicular to the first direction. It means that sub-beams 81, 82 having different wavelengths are separated spatially, thereby the photon detector array 90 can receive light signals with different wavelength components in the collected light beam separately.

As an example, a length L of each row of detecting units 91, 92 in the second direction may be larger than or equal to a height H of images 61, 62, which are formed on a surface of the photon detector array 90 through the imaging device 80, of the slit 60 in the second direction (y-direction shown in FIG. 3). The images 61, 62, which are shown in FIG. 3, of the slit 60 correspond to the sub-beam 81 with wavelength $\lambda_1$ and the sub-beam 82 with wavelength $\lambda_2$, respectively. As an example, it is possible to use a two-dimensional array of the detecting units (i.e., each row of the detecting units includes a plurality of detecting units), rather than a one-dimensional array of the detecting units, and thus the size of the photon detector array 90 in the second direction can be increased remarkably. As to a common round light spot, it is possible to use a one-dimensional array of the detecting units arranged along the first direction (x-direction shown in FIG. 3) because the size of the light spot in a lengthwise direction of the slit 60 is usually short (it may result in a problem of too much loss of light energy if said size is too long). As to the strip-shaped light spot according to the embodiment of the present disclosure, however, it can obtain a larger length in the lengthwise direction of the slit 60 to allow a larger amount of light to pass through the slit 60. If a one-dimensional array of the detecting units were used, however, the size of the photon detector array 90 in the second direction may be limited by the size of individual detecting unit. By using a two-dimensional array of the detecting units, it can increase the matching degree between the slit 60 and the strip-shaped light spot 25, and help to sufficiently take the advantage, which is brought by the strip-shaped light spot, of the amount of light passing therethrough. As an example, the photon detector array 90 may be formed by a two-dimensional Charge Coupled Devices (CCD) array.

In an example, a height of the strip-shaped light spot 25 in the second direction is consistent with a height of the slit 60 in the second direction and a length of each row of detecting units 91, 92 in the second direction. In this example, in the case that a magnification ratio of the imaging device 80 is 1, it is possible to match the sizes of the strip-shaped light spot 25, the slit 60 and the photon detector array 90 as desired to ensure that light signals are completely captured by the detector. However, embodiments of the present disclosure are not limited to this. Other examples may also be used, e.g., the height of the strip-shaped light spot 25 in the second direction is smaller than or equal to a height of the slit 60 in the second direction, and smaller than or equal to lengths of each row of detecting units 91, 92 in the second direction. It is also possible to set the above sizes of the strip-shaped light spot 25, the slit 60 and the photon detector array 90 with reference to the magnification ratio of the imaging device 80 so as to obtain the desired matching.

In an example, and in particular in a case that each row of detecting units includes a plurality of detecting units, each spectral line in the spectrogram may be generated by a superposed output of electrical signals obtained by all the detecting units in one row of detecting units.

In an example, the light beam collecting device 50 may include a first lens 51, a second lens 52 and a filter 53. The first lens 51 is configured to receive a light beam from the sample. The second lens 52 is configured to converge the collected light beam onto the slit 60. The filter 53 is located between the first lens 51 and the second lens 52, and configured to allow the light within a selected wavelength range of the collected light beam to pass through, but filter out the light within other wavelength ranges. As an example, when detecting a Raman spectrum, the filter 53 may be a long pass filter configured to allow Raman scattering light having relatively long wavelengths to pass through, but filter out other unwanted light such as Rayleigh scattering light. However, the filter 53 is not always necessary. In some embodiments, the light beam collecting device 50 may do not include the filter 53, for example, when measuring a continuous spectrum (e.g., a fluorescence spectrum).

As an example, a focal point of the focusing lens 30 may coincide with a focal point of the first lens 51. In this case, the signal intensity of Raman light in the collected light beam 21 is high, which helps to improve the detection accuracy.

Although the slit 60 is illustrated as a rectangular slit in the embodiment shown in FIG. 2, it is not always necessary, for example, the slit 60 may also have a plurality of slit portions with different widths, in shapes such as steps or trapezoids, so as to achieve multiple-resolution imaging.

Figure 4:
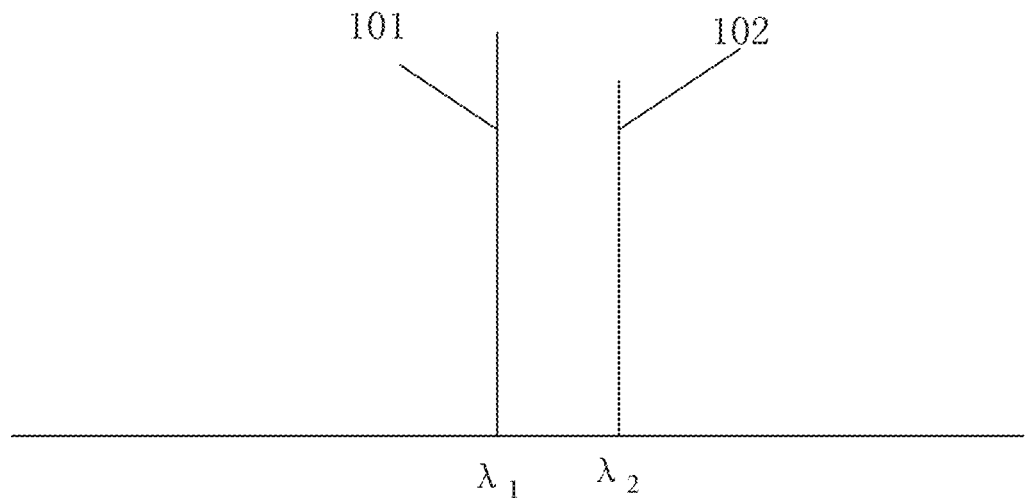
FIG. 4 schematically shows spectral lines in a spectrogram.

In an example, each spectral line 101, 102 in the spectrogram (as shown in FIG. 4) may be generated by a superposed output of electrical signals obtained by all the detecting units in one row of detecting units 91, 92. In this case, it can form a single spectrogram.

In the spectrum inspecting apparatus 100 according to an embodiment of the present disclosure, the collimating device 70 may for example include a collimating lens or a concave mirror, the dispersing device 71 may for example include a dispersing grating, and the imaging device 80 may for example include a converging lens or a concave mirror. However, embodiments of the present disclosure are not limited to this. The collimating device 70, the dispersing device 71 and the imaging device 80 may also use known collimating devices, dispersing devices and imaging devices in any other forms in the art.

Figure 5:
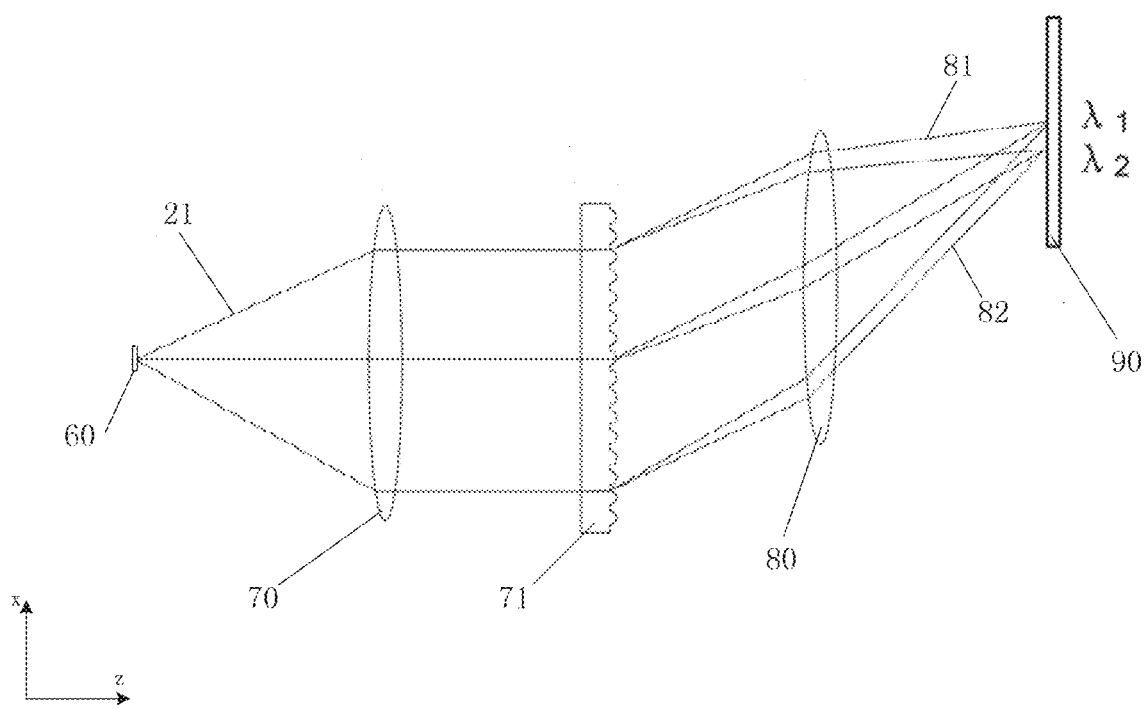
FIG. 5 schematically shows a partial view of a spectrum inspecting apparatus according to an embodiment of the present disclosure along y-direction.

FIG. 5 schematically shows a partial view of a spectrum inspecting apparatus according to an embodiment of the present disclosure along y-direction. It is clearly shown in FIG. 5 that the dispersing device 71 splits the light beam 20 into sub-beams having different wavelengths, such as the sub-beam 81 having wavelength $\lambda_1$ and the sub-beam 82 having wavelength $\lambda_2$, respectively.

According to the spectrum inspecting apparatus of an embodiment of the present disclosure, it forms an elongate light spot on a sample 40 being inspected by combining the light beam having a rectangular cross-section and a cylindrical lens. The elongate light spot can decrease the power density at the focal point so as to prevent the sample 40 being inspected from being damaged by the intense laser. In an example, sizes of the elongate light spot converged on the sample 40, the strip-shaped light spot at the slit, the slit and the photon detector array are set to satisfy a corresponding matching relation, thus it can ensure that signal light at the sample 40 could be inspected to a maximum extent so as to increase the utilization ratio of light, thereby increasing the SNR of the optical signal and sensitivity of the system.

As an example, after being focused by the focusing lens 30 (a cylindrical lens), the light beam emitted from the laser source 10 forms an elongate light spot, whose length is equal to a height of the rectangular cross-section of the light beam. The size of the photon detector array in a height direction is sufficient to ensure that signals excited from the sample are received as much as possible.

Figure 6:
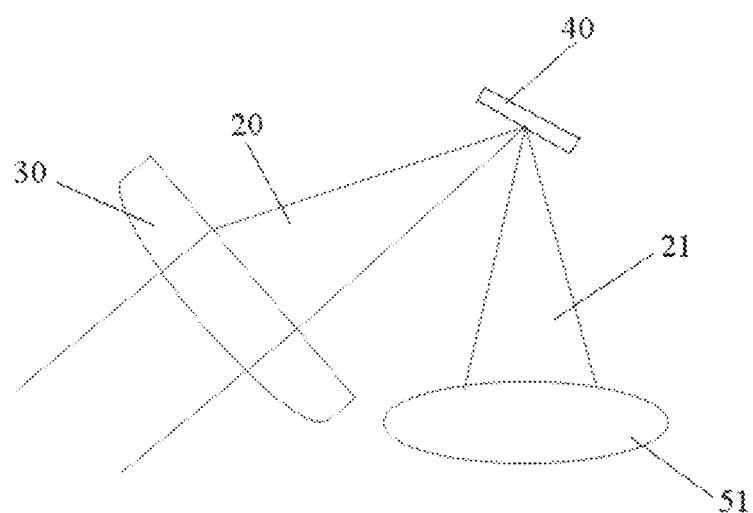
FIG. 6 schematically shows an exemplary arrangement of a focusing lens and a light beam collecting device in a spectrum inspecting apparatus according to an embodiment of the present disclosure.

Although FIG. 1 shows the laser 10, the focusing lens 30, the sample 40 and the light beam collecting device 50 in a paper sheet, it should be understood by a person skilled in the art that such illustration is merely for the purpose of showing a light path more clearly, rather than limiting the spatial positions of optical members of the spectrum inspecting apparatus to be in a straight line. For example, the light beam 20 focused by the focusing lens 30 may form any angle with respect to the collected light beam 21 collected by the light beam collecting device 50 (it is not constrained by the law of reflection because Raman scattering light from the sample 40 excited by the light beam 20 may emit toward any direction, rather than common reflection), as shown in FIG. 6.

All of the above embodiments of the present disclosure may be combined freely to form other embodiments unless there are technical barriers or contradictions. These other embodiments will also fall within scope of the present disclosure.

Although the present disclosure has been explained with reference to the drawings, the embodiments shown in the drawings are merely illustrative, instead of limiting the present disclosure. Scales in the drawings are only illustrative, instead of limiting the present disclosure.

Although some embodiments of the general inventive concept are shown and explained, it would be appreciated by those skilled in the art that modifications and variations may be made in these embodiments without departing from the principles and spirit of the general inventive concept of the present disclosure, the scope of which is defined in the appended claims and their equivalents.

What is claimed is:

1. A spectrum inspecting apparatus, comprising:
a laser source configured to emit a light beam;
a focusing lens configured to converge the light beam onto a sample being inspected;
a light beam collecting device disposed downstream the focusing lens and configured to collect a light beam signal, which is excited by said light beam, from the sample so as to form a collected light beam, and converge the collected light beam so as to form a strip-shaped light spot;
a slit configured to receive the collected light beam that has been converged by the light beam collecting device, and couple the collected light beam to downstream of a light path;
a collimating device disposed downstream the slit and configured to collimate the collected light beam from the slit;
a dispersing device disposed downstream the collimating device and configured to disperse the collected light beam that has been collimated by the collimating device so as to form a plurality of sub-beams having different wavelengths;
an imaging device and a photon detector array, the imaging device being disposed downstream the dispersing device and configured to image the plurality of sub-beams on the photon detector array respectively, the photon detector array being used to convert the plurality of sub-beams imaged thereon into electrical signals for forming a spectrogram,
wherein the light beam emitted from the laser source has a rectangular cross-section, the focusing lens is a cylindrical lens, the strip-shaped light spot impinges on the slit, and a length of the strip-shaped light spot is smaller than a length of the slit so that the strip-shaped light spot entirely falls into the slit in a lengthwise direction,
wherein the strip-shaped light spot completely covers the slit in a widthwise direction, and the width of the strip-shaped light spot is smaller than 5 times of the width of the slit.

2. The spectrum inspecting apparatus of claim 1, wherein the dispersing device is configured to separate the plurality of sub-beams in a first direction, and the photon detector array has a plurality of rows of detecting units, wherein each row of detecting units is arranged along a second direction that is perpendicular to the first direction.

3. The spectrum inspecting apparatus of claim 2, wherein a length of each row of detecting units in the second direction is larger than or equal to a height of images, which are formed on a surface of the photon detector array through the imaging device, of the slit in a second direction.

4. The spectrum inspecting apparatus of claim 3, wherein a height of the strip-shaped light spot in the second direction is consistent with a height of the slit in the second direction and a length of each row of detecting units in the second direction.

5. The spectrum inspecting apparatus of claim 3, wherein each spectral line in the spectrogram is generated by a superposed output of electrical signals received by all the detecting units in one row of detecting units.

6. The spectrum inspecting apparatus of claim 1, wherein the light beam collecting device comprises:

a first lens configured to receive a light beam from the sample;
a second lens configured to converge the collected light beam onto the slit; and
a filter located between the first lens and the second lens, and configured to allow light within a selected wavelength range of the collected light beam to pass through, while filtering out light within other wavelength ranges.

7. The spectrum inspecting apparatus of claim 6, wherein a focal point of the focusing lens coincides with a focal point of the first lens.

8. The spectrum inspecting apparatus of claim 1, wherein the light beam collecting device comprises:
a first lens configured to receive a light beam from the sample;
a second lens configured to converge the collected light beam onto the slit; and
a filter located between the first lens and the second lens, and configured to allow light within a selected wavelength range of the collected light beam to pass through, while filtering out light within other wavelength ranges.

9. The spectrum inspecting apparatus of claim 8, wherein a focal point of the focusing lens coincides with a focal point of the first lens.

10. The spectrum inspecting apparatus of claim 2, wherein the light beam collecting device comprises:
a first lens configured to receive a light beam from the sample;
a second lens configured to converge the collected light beam onto the slit; and
a filter located between the first lens and the second lens, and configured to allow light within a selected wavelength range of the collected light beam to pass through, while filtering out light within other wavelength ranges.

11. The spectrum inspecting apparatus of claim 10, wherein a focal point of the focusing lens coincides with a focal point of the first lens.

12. The spectrum inspecting apparatus of claim 3, wherein the light beam collecting device comprises:
a first lens configured to receive a light beam from the sample;
a second lens configured to converge the collected light beam onto the slit; and
a filter located between the first lens and the second lens, and configured to allow light within a selected wavelength range of the collected light beam to pass through, while filtering out light within other wavelength ranges.

13. The spectrum inspecting apparatus of claim 12, wherein a focal point of the focusing lens coincides with a focal point of the first lens.

14. The spectrum inspecting apparatus of claim 4, wherein the light beam collecting device comprises:
a first lens configured to receive a light beam from the sample;
a second lens configured to converge the collected light beam onto the slit; and
a filter located between the first lens and the second lens, and configured to allow light within a selected wavelength range of the collected light beam to pass through, while filtering out light within other wavelength ranges.

15. The spectrum inspecting apparatus of claim 14, wherein a focal point of the focusing lens coincides with a focal point of the first lens.

16. The spectrum inspecting apparatus of claim 5, wherein the light beam collecting device comprises:
   a first lens configured to receive a light beam from the sample;
   a second lens configured to converge the collected light beam onto the slit; and
   a filter located between the first lens and the second lens, and configured to allow light within a selected wavelength range of the collected light beam to pass through, while filtering out light within other wavelength ranges.

17. The spectrum inspecting apparatus of claim 16, wherein a focal point of the focusing lens coincides with a focal point of the first lens.

18. The spectrum inspecting apparatus of claim 1, wherein the photon detector array is formed by a two-dimensional array of Charge Coupled Devices.

19. The spectrum inspecting apparatus of claim 1, wherein the collimating device comprises a collimating lens or a concave mirror, wherein the dispersing device comprises a dispersing grating, and wherein the imaging device comprises a converging lens or a concave mirror.

* * * * *